(12) United States Patent
Bestavros et al.

(10) Patent No.: US 6,370,584 B1
(45) Date of Patent: Apr. 9, 2002

(54) DISTRIBUTED ROUTING

(75) Inventors: Azer Bestavros, Wayland; Mark E. Crovella, Scituate, both of MA (US)

(73) Assignee: Trustees of Boston University, Boston, MA (US)

(*) Notice: Subject to any disclaimer, the term of this patent is extended or adjusted under 35 U.S.C. 154(b) by 0 days.

(21) Appl. No.: 09/144,668

(22) Filed: Sep. 1, 1998

Related U.S. Application Data

(60) Provisional application No. 60/071,012, filed on Jan. 13, 1998.

(51) Int. Cl.[7] .................. G06F 15/16; G06F 15/173

(52) U.S. Cl. ............. 709/238; 709/201; 709/217; 709/223; 709/226

(58) Field of Search .................. 709/218, 201, 709/226, 206, 203, 238, 240, 241, 243, 104, 105, 217, 223; 711/202; 714/15; 707/3

(56) References Cited

U.S. PATENT DOCUMENTS

| | | | | |
|---|---|---|---|---|
| 5,031,089 A | * | 7/1991 | Liu et al. ................ | 364/200 |
| 5,774,660 A | * | 6/1998 | Brendel et al. ........... | 709/201 |
| 5,918,013 A | * | 6/1999 | Mighdoll et al. ......... | 709/218 |
| 6,026,474 A | * | 6/1999 | Carter et al. ............. | 711/202 |
| 5,951,694 A | * | 9/1999 | Choquier et al. .......... | 714/15 |
| 5,974,409 A | * | 10/1999 | Sanu et al. .............. | 707/3 |
| 6,006,264 A | * | 12/1999 | Colby et al. ............. | 709/226 |
| 6,021,428 A | * | 2/2000 | Miloslavsky ............. | 709/206 |

OTHER PUBLICATIONS

The Magicrouter, an Application of Fast Packet Interposing, Technical Report, Boston University, Boston, MA, May 17, 1996.
A Scalable and Distributed WWW Proxy System, K.L.E Law, B. Nandy, A. Chapman Nortel Limited Research Report, Proceedings of ACM Multimedia, Nov., 1997.
A Scalable and Highly Available Web Server, Daniel M. Dias, William Kish, Rajat Mukherjee and Renue Tewari Proceedings of IEEE COMPCON '96, Feb., 1996.
WRL Research Report 95/5, Network Behavior of a Busy Web Server and its Clients, Jeffrey C. Mogul, Digital Equipment Corp., Western Regional Laboratory, Palo Alto, CA, Oct., 1995.
Connecting Private LANs to the Internet, Chris Chlap, Jan. 6, 1999.
IP Address Translation, Diplomarbeit, Michael Hasenstein, Dec., 1997.
The IP Network Address Translator (NAT), K. Egevang, P. Francis, May, 1994.
IBM Research Report, NetDispatcher: A TCP Connection Router, G. Goldszmidt, G. Hunt IBM Research Division, Yorktown Heights, NY, May 19, 1997.
One–IP: Techniques for Hosting a Service on a Cluster of Machines, Om P. Damani, P. Emerald Chung, Yennun Huang, Chandra Kintala, Yi–Min Wang, Sixth International WWW Conference, Apr., 1997.
Scaling the Internet Web Servers, Cisco Systems, Nov., 1997.

* cited by examiner

Primary Examiner—Mark H. Rinehart
Assistant Examiner—Paul Kang
(74) Attorney, Agent, or Firm—Weingarten, Schurgin, Gagnebin & Lebovici LLP

(57) ABSTRACT

In a computer network with a plurality of client computers and a group of host computers, each host computer in the group is capable of both servicing requests from the client computers and rerouting requests to other host computers in the group. Distribution of servicing and routing functions in accordance with predetermined criteria promotes fault tolerance, transparency and load sharing within the group. The predetermined criteria can be either stateless or utilize states. In the case of an Internet Web server, distribution of Layer 4 routing obviates the need for a connection router to achieve load balancing. Distribution of Layer 3 routing reduces reliance on routing devices in general.

41 Claims, 3 Drawing Sheets

DISTRIBUTED ROUTING

CROSS REFERENCE TO RELATED APPLICATIONS

Priority is claimed to U.S. Provisional Patent Application Ser. No. 60/071,012, entitled METHODS FOR DISTRIBUTED PACKET REWRITING, filed Jan. 13, 1998.

STATEMENT REGARDING FEDERALLY SPONSORED RESEARCH OR DEVELOPMENT

Research and development of the subject matter of this application was at least partially supported by United States government grants NSF CCR-9706685 and CCR-9501882. The United States government may have rights in this invention.

BACKGROUND OF THE INVENTION

The present invention is related to computer networks, and particularly to routing of data units in computer networks.

The flow of traffic in computer networks such as the World Wide Web is limited by the performance of host computers. Each host computer interacts with multiple client computers. For example, a host computer that hosts an Internet Web Site responds to requests from multiple client computers by transmitting the data that comprises the pages of the web site to the client computers. However, the number of client computers that can be contemporaneously serviced by the host computer is limited. Hence, access to the web site is limited by the performance of the host computer.

It is known to employ a distributed system to increase the load handling capability of a web site. The distributed system includes a "cluster" of host computers, each of which is capable of servicing requests from clients and may be assigned a distinct Internet Protocol ("IP") address. To access a web site that is associated with a cluster of hosts on the World Wide Web, a string of text known as a "domain name" that identifies the web site is initially entered at the client computer. The domain name is employed to obtain an IP address that is associated with one of the host computers in the cluster. The IP address may be obtained from a mapping that is stored by the client computer or an intermediate network device which maintains mappings of domain names to IP addresses based on information that is obtained from a "root host computer." The root host computer encourages distribution of the load within the cluster by advertising the different IP addresses of the hosts in the cluster to intermediate network devices in a round-robin manner. The intermediate network devices cache the mappings that are advertised by the root host to facilitate timely response. However, caching of IP addresses by clients and intermediate network devices can cause an imbalance of the load within the cluster. For example, if a gateway device caches the IP address of a particular host in the cluster, every client that obtains an IP address for the web site from that gateway device transmits requests to a single host within the cluster. This can create a serious imbalance in the case of a gateway device that handles all traffic for a particular country or region.

It is known to employ a connection router to balance the load in the cluster. The connection router is a device that is coupled between the clients and the cluster. The root host computer advertises the IP address of the connection router so that all clients employ the IP address of the connection router when transmitting requests to the cluster. The connection router monitors the activity of each host in the cluster and selectively distributes the requests to the hosts in a manner which tends to balance the load. However, connection routers inhibit efficiency and scaling because at least one connection router is required even if only a small number of hosts are needed, and no more than a predetermined number of hosts can be supported by a single connection router. Further, the entire cluster becomes crippled when the connection router fails.

BRIEF SUMMARY OF THE INVENTION

In accordance with the present invention, routing functions for a group of computers are distributed among the computers in the group. In the case of a cluster of host devices that host a Web Site, each host device is capable of both servicing requests from client devices and rerouting requests to other host devices in the cluster to promote load sharing. Layer 4 routing functions can be distributed to obviate the need for a connection router to achieve load balancing. Layer 3 routing functions can be distributed to reduce reliance on routers in general.

Distributing routing functions among each host device in the cluster facilitates scaling. Increasing the number of host devices in the cluster results in a proportional improvement in performance because each new host device adds both servicing and routing capability. Further, the size of the cluster is not constrained to a fixed upper limit.

Distributing routing functions among each host device in the cluster makes the cluster less susceptible to catastrophic failure. In particular, the failure of a host device results in a proportional degradation in the capacity of service that can be provided by the cluster. Further, operation of the cluster as a whole is not completely dependent upon any single device.

Distributing routing functions facilitates transparency. Client devices are not exposed to design internals, and cannot distinguish and target individual devices in the cluster. Efficiency is also facilitated because the capacity of the cluster to service and route requests is approximately equal to the total capacity of the constituent host devices, regardless of the number of hosts in the cluster.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

U.S. Provisional Patent Application Ser. No. 60/071,012, entitled METHODS FOR DISTRIBUTED PACKET REWRITING, filed Jan. 13, 1998 is incorporated herein by reference.

Figure 1:
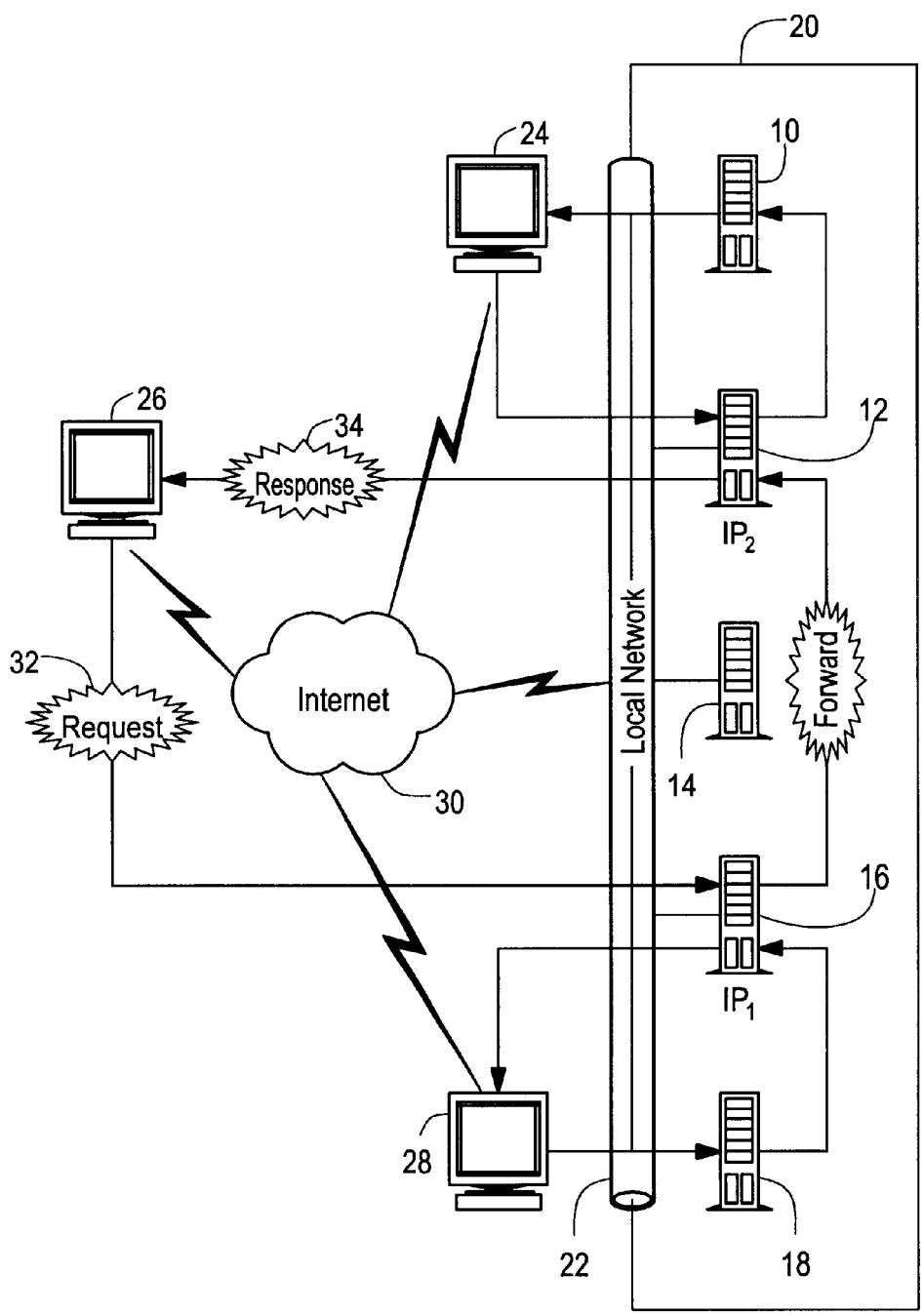
FIG. 1 is a diagram of a distributed web site that employs distributed routing within a Local Area Network.

Referring to FIG. 1, a plurality of host devices 10, 12, 14, 16, 18 are organized into a group 20 such as a cluster. In the illustrated embodiment, the host devices are each members of a Local Area Network ("LAN") 22. A plurality of client devices 24, 26, 28 are coupled with the group 20 via a network 30 such as the Internet.

Each host device 10, 12, 14, 16, 18 in the group 20 is capable of servicing requests from the client devices 24, 26, 28. Requests are directed from an individual client to an individual host. For example, request 32 is directed from client 26 to host 16. The requests may include data units such as packets, frames and cells that prompt transmission of web site pages in the case of a group 20 that hosts an Internet Web Site. Each request is serviced by transmitting a response from at least one of the host devices to the client device that transmitted the request. For example, response 34 is transmitted from host 12 to client 16.

Each host device 10, 12, 14, 16, 18 in the group is capable of rerouting requests to other host devices in the group to promote load sharing within the group. For example, request 32 is rerouted from host 16 to host 12. Upon receiving a request from one of the client devices, the host device will either service the request or reroute the request to another host device in the group in accordance with predetermined criteria.

The predetermined criteria for determining whether to service or reroute a request may include a stateless rerouting function. In the illustrated embodiment, the stateless rerouting function computes a hash value based on source and destination Internet Protocol ("IP") addresses and Transmission Control Protocol ("TCP") port addresses that are associated with the request. In particular, the IP address and port number associated with the client device are used as inputs into a hash function to determine which host will service the request. The IP address/port of the client forms a unique key for each request so successive port numbers from the same client device tend to map to different hosts, thereby dispersing requests among the hosts and promoting balance of the load within the group 20.

The predetermined criteria for determining whether to service or reroute a request may include a rerouting function that utilizes states. To implement the rerouting function, each host 10, 12, 14, 16, 18 tracks TCP connection establishment and termination between clients 24, 26, 28 and the group 20 by maintaining a state table that indicates which connections are being rerouted. The state table is employed to reroute requests based on conditions such as current load on each host, availability of data for the response, requested service type (e.g., FTP, HTTP), requested file, file type, file size, a level of Quality of Service ("QoS") to be extended to the particular client, and the necessity that successive requests be rerouted to the same host for correct session semantics. A user daemon can be employed to adjust the rerouting criteria as conditions change. After recording an indication of which host is selected in the state table, the address information associated with the request is updated using a Media Access Control ("MAC") rewriting technique.

To update the address information associated with the rerouted request 32 when there is only one published IP address for the group 20, the IP address of the original destination device 16 ($IP_1$) associated with the request 32 is replaced with the IP address of the new destination device 12 ($IP_2$) before the request 32 is rerouted. When the new destination device 12 services the client 26 with response 34, the IP new source address ($IP_2$) is replaced with the original IP source address ($IP_1$) in the data units that are transmitted in the response 34 to avoid causing confusion at the client device 26. Further, IP and TCP checksums which depend on the destination IP addresses in the data units are adjusted to agree with $IP_1$.

To update the address information associated with rerouted requests when the group employs more than one published IP address, both the original address ($IP_1$) and the new address ($IP_2$) are included in the data units which are transmitted between the original destination device 16 and the new destination device 12. In the illustrated embodiment, the MAC address of the data unit is rewritten prior to transmission and the original IP addresses and checksums are not modified. However, this technique is unsuitable if both host devices are not located on the same LAN.

Figure 2:
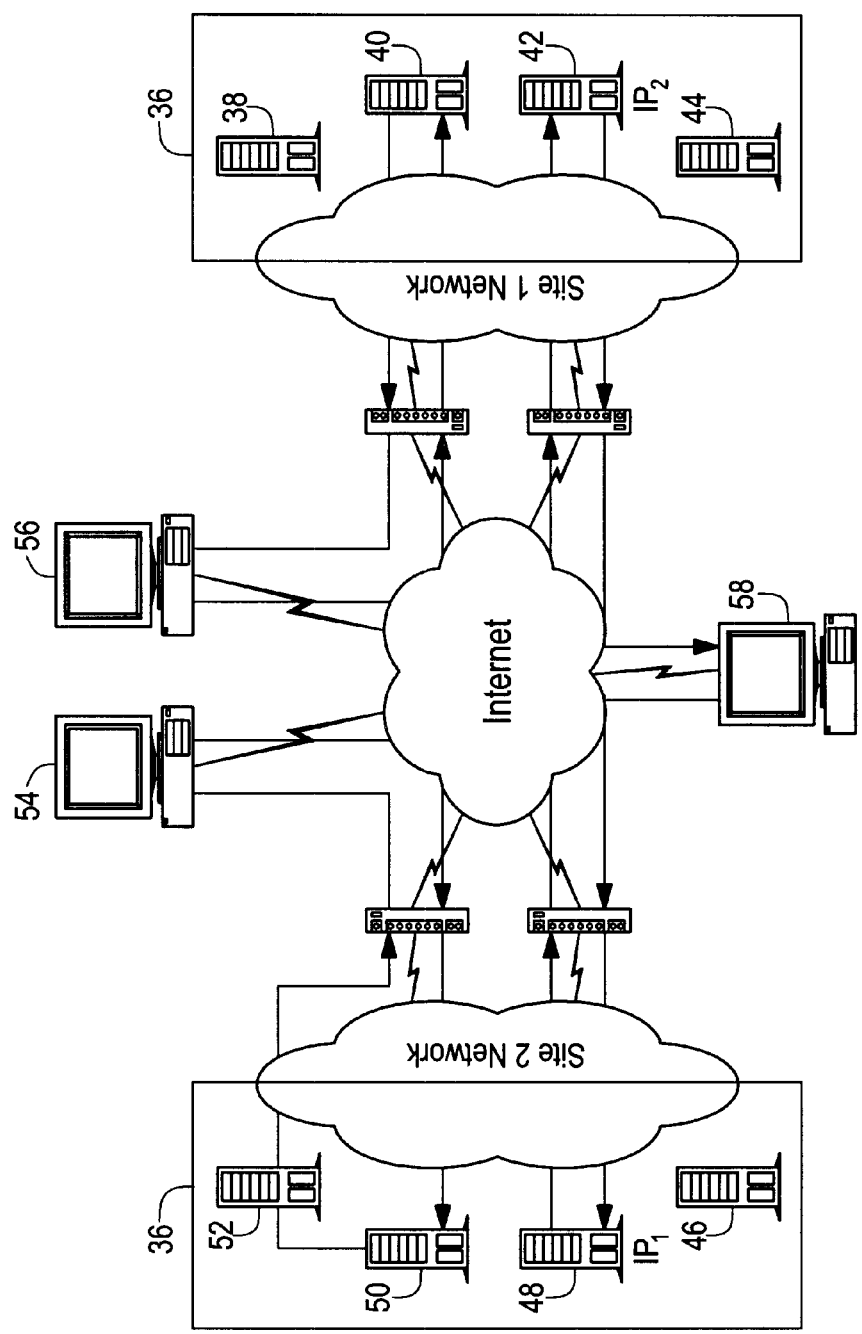
FIG. 2 is a diagram of a distributed web site that employs distributed routing across networks.

Referring to FIG. 2, the host devices may be members of a diverse group 36 such as a Virtual Local Area Network ("VLAN"), the members of which are not all on a single LAN. Each host device 38, 40, 42, 44, 46, 48, 50, 52 is capable of servicing requests from the client devices 54, 56, 58 and rerouting requests to other host devices in the group 36 in order to promote load sharing within the group. Upon receiving a request from one of the client devices, the host device will either service the request or reroute the request to another host device in the group in accordance with predetermined criteria. The host device to which the request is rerouted is not necessarily located on the same LAN as the host device that originally received the request. The predetermined criteria may include a stateless rerouting function as described above and a rerouting function that utilizes states. The rerouting function that utilizes states could be employed to reroute requests based on conditions such as current load on each host, distance between the client and host, availability of data for the response, a level of Quality of Service ("QoS") to be extended to the particular client, and the necessity that successive requests be rerouted to the same host for correct session semantics.

IP-level rerouting is employed to update the address information associated with rerouted data units when greater than one IP address is published for the group and the hosts are located on different LANs. In the illustrated embodiment, an original data unit 60 is tunneled from host device 48 ($IP_1$) to host device 42 ($IP_2$) using IPIP encapsulation. The outer IPIP header is discarded and the inner header is interpreted when the packet arrives at device 42.

In general, the host device designated by address $IP_2$ eventually receives and processes a data unit bearing the original destination address $IP_1$ whether MAC rewriting or IPIP encapsulation is employed. Therefore, each host is configured to respond to all of the possible original destination addresses (such as $IP_1$) in the group.

Figure 3:
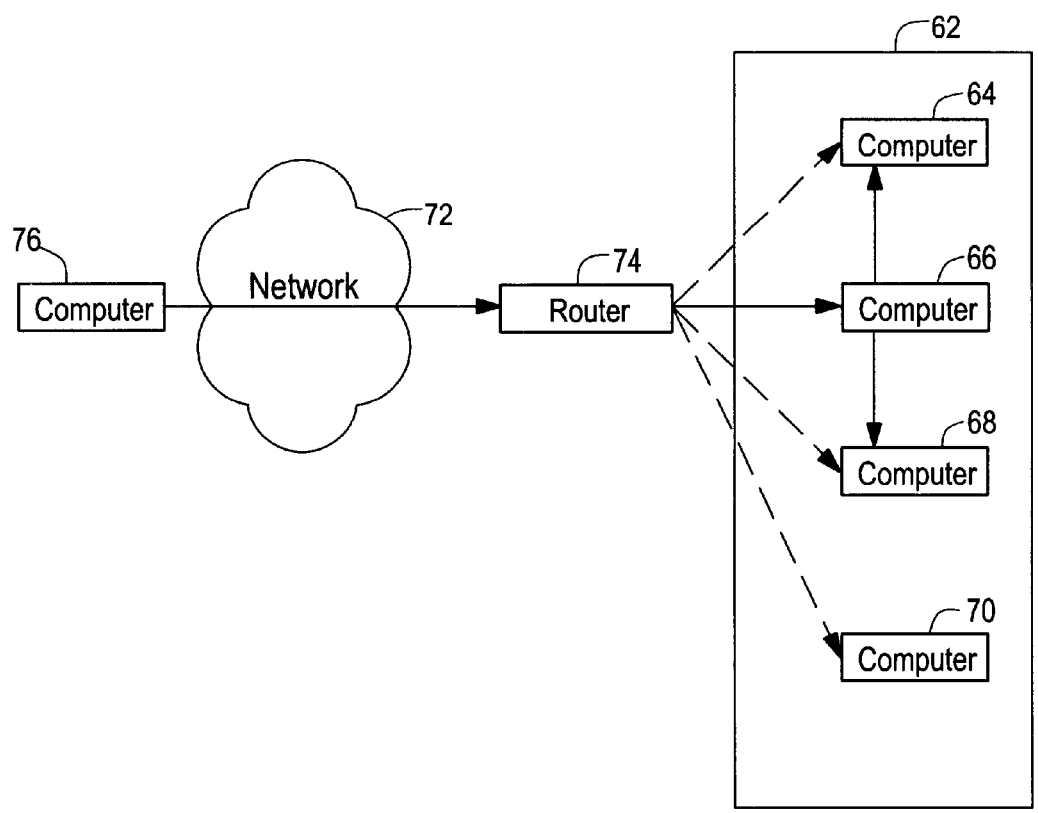
FIG. 3 is a diagram of a network in which a random router is employed in conjunction with distributed routing.

Referring to FIG. 3, distributed Layer 3 routing can be employed for transmissions between various types of computer devices in a network. In the illustrated embodiment, a group 62 of computer devices 64, 66, 68, 70 is coupled to a network 72 via a router device 74. Data units are transmitted toward at least one of the computer devices in the group 62 by another computer device 76 via the network 72. The data units may indicate group membership of the destination computer device by specifying, for example, the LAN with which the destination computer is associated. The router device 74 is operative to receive data units from the network 72 that are destined for the group 62. The router device 74 distributes the received data units among the computer devices in the group 62 without regard to which individual computer device or devices are designated as being a destination for the data unit. In the illustrated embodiment, the router randomly transmits each received data unit to one of the computers in the group. The computer that receives the data unit from the router is operative to determine which computers are designated as destinations for the data unit, and forwards the data unit to each of the designated computers. Hence, Layer 3 routing some or all of the functions that were formerly provided by a router device are distributed among the computers in the group.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. Apparatus for responding to data units that are transmitted from source computers via a computer network, comprising:

a router device for receiving said data units on behalf of a plurality of computer devices organized within a group, wherein said router device operates to distribute said data units among said plurality of computer devices, wherein each of said plurality of computer devices monitors connection establishment and termination between said source computers and each of said plurality of computer devices, and wherein each one of said plurality of computer devices is operable to receive those of said data units which are addressed to it, and wherein each one of said plurality of computer devices within said group is further operable to perform a distributed routing function to:

process a first subset of said data units addressed to it by transmitting a response to at least one of said source computers in the event that predetermined criteria are satisfied; and reroute a second subset of said data units addressed to it to other ones of said computer devices organized within said group, without processing said second subset of said data units, to obtain a predetermined distribution of the number of data units processed by each said computer device in the event that the predetermined criteria are not satisfied, wherein said rerouting is responsive, at least in part, to said monitoring of said connection establishment and termination between said source computers and each of said plurality of computer devices.

2. The apparatus of claim 1 further including a router device that is coupled between said source computers and said group, and which is operative to disperse said data units among the computer devices in said group.

3. The apparatus of claim 1 further including a stateless rerouting function that is employed to designate one of the computer devices in said group as a destination for a rerouted data unit.

4. The apparatus of claim 3 wherein said stateless rerouting function includes a hash function which provides a destination designator from address information that is associated with the data units.

5. The apparatus of claim 4 wherein said address information includes at least one Internet Protocol address and at least one Transmission Control Protocol port address.

6. The apparatus of claim 1 further including a rerouting function that utilizes states and is employed to designate one of the computer devices in said group as a destination for a rerouted data unit.

7. The apparatus of claim 6 wherein said rerouting function provides an output based at least in part on information selected from the group consisting of load on each computer device in the group, availability of data, requested service type, requested file, requested file type, requested file size, level of Quality of Service to be extended to the particular client, and the necessity that successive requests be rerouted to the same computer device for correct session semantics.

8. The apparatus of claim 1 wherein, when a data unit that designates a first address as destination is rerouted from a first computer device that is assigned said first address in said group to a second computer device that is assigned a second address in said group, the data unit is modified to designate the second address as destination before the data unit is rerouted to the second computer if only one address is published in the network for the group.

9. The apparatus of claim 8 wherein the second computer device processes the data unit by transmitting at least one data unit to the client device in response, and the response data unit designates the first address as source.

10. The apparatus of claim 1 wherein the data unit includes a Media Access Control address, and the rerouting function rewrites the Media Access Control address.

11. The apparatus of claim 1 wherein the rerouting function tunnels the data unit to at least one other computer device in the group.

12. The apparatus of claim 1, wherein said router device comprises one of said computer devices organized within said group.

13. A method for processing data units that are transmitted from computer devices to a group of computers via a computer network, comprising:

receiving said data units at a router device on behalf of said group of computers, wherein said router device operates to distribute said data units among said group of computers;

monitoring, by a plurality of computers within said group of computers, connection establishment and termination between said computer devices and said group of computers;

receiving, responsive to said distribution by said router device, respective ones of said data units at ones of said computers in said group, such that each of said data units is received by a respective one of said computers in said group;

performing a distributed routing function in at least a plurality of said computers in said group, wherein said routing function includes determining, by respective ones of said plurality of computers within said group, whether to process ones of said data units received at said respective ones of said plurality of computers within said group based on predetermined criteria, processing said data units by respective ones of said plurality of computers within said group receiving respective ones of said data units if said predetermined criteria are satisfied by transmitting at least one responsive data unit to the computer device that transmitted the data unit toward the group, and rerouting said data units by said respective ones of said plurality of computers within said group receiving said respective ones of said data units to other ones of said computers in said group, without processing said second subset of said data units, to obtain a predetermined distribution of the number of data units processed by each said computer in said group, if said predetermined criteria is not satisfied, wherein said rerouting is responsive, at least in part, to said monitoring of said connection establishment and termination between said computer devices and said group of computers.

14. The method of claim 13 further including the step of employing a hash value to designate one of the computers in the group to process the data unit.

15. The method of claim 14 further including the step of using address information from the data unit including at least one Internet Protocol address and at least one Transmission Control Protocol port address as inputs to calculate the hash value.

16. The method of claim 13 further including the step of designating one of the computers in the group to process the data unit based upon state information associated with the other computers in the group.

17. The method of claim 16 further including the step of designating the computer to process the data unit based at least in part on information selected from the group consisting of load on each computer in the group, availability of data for the response, requested service type, requested file, requested file type, requested file size, level of Quality of Service to be extended to the particular client, and the necessity that successive data units be rerouted to the same computer for correct session semantics.

18. The method of claim 13 further including the step of, when a data unit that designates a first address as destination is rerouted from a first computer device that is assigned said first address in said group to a second computer device that is assigned a second address in said group, modifying the data unit to designate the second address as destination before routing the data unit to the second computer if only one address is published in the network for the group.

19. The method of claim 18 further including the step of processing the data unit from the second computer by transmitting a responsive data unit that designates the first address as source to the computer that transmitted the data unit.

20. The method of claim 13 wherein the data unit includes a Media Access Control address, and further including the step of rewriting the Media Access Control address.

21. The method of claim 13 including the further step of tunneling the data unit to at least one other computer device in the group.

22. Apparatus for hosting an Internet Server Site by servicing requests that are transmitted from client computers via the Internet, comprising:
a router device operable to receive said requests on behalf of a cluster of host computers, wherein said router device operates to distribute said data units among ones of said cluster of host computers, wherein a plurality of host computers within said cluster of host computers is operative to perform a distributed routing function to:
monitor connection establishment and termination between said computer devices and said group of computers;
receive said requests at respective ones of said plurality of host computers within said cluster of host computers to which respective ones of said requests are directed by said router device;
service, at said respective ones of said plurality of host computers within said cluster of host computers at which respective ones of said requests are received, at least some of said requests upon satisfaction of a condition, and
for at least some requests, reroute at least some of the data units associated with said requests from said respective ones of said plurality of host computers within said cluster of host computers at which respective ones of said requests are received, without processing said data units that are rerouted, to at least one other host computer in said cluster to obtain a predetermined distribution of the number of requests serviced by each said host computer upon failure of the condition, wherein said rerouting is responsive, at least in part, to said monitoring of said connection establishment and termination between said client computers and ones of said cluster of host computers.

23. The apparatus of claim 22 wherein each host computer in said cluster is capable of servicing each of said requests.

24. The apparatus of claim 22 further including a stateless rerouting function for designating one of the host computers in the cluster as a destination for a rerouted request based solely on information that is included in the request.

25. The apparatus of claim 24 wherein said stateless rerouting function includes a hash function which provides a destination designator from address information that is associated with the request.

26. The apparatus of claim 25 wherein said address information includes at least one Internet Protocol address and at least one Transmission Control Protocol port address.

27. The apparatus of claim 22 further including a rerouting function that utilizes states and is employed to designate one of the host computers in said cluster as a destination for a rerouted request.

28. The apparatus of claim 27 wherein said rerouting function provides an output based at least in part on information selected from the group consisting of load on each host computer, availability of data, requested service type, requested file, requested file type, requested file size, level of Quality of Service to be extended to the particular client, and the necessity that successive requests be rerouted to the same host computer for correct session semantics.

29. The apparatus of claim 22 wherein, when a request that designates a first Internet Protocol address as destination is rerouted from a first host computer that is assigned said first Internet Protocol address in said cluster to a second host computer that is assigned a second Internet Protocol address in said cluster, the request is modified to designate the second Internet Protocol address as destination before the request is rerouted to the second host computer if only one address is published in the network for the server site.

30. The apparatus of claim 29 wherein the second host computer services the request by transmitting a response to the client device, and the response designates the first Internet Protocol address as source.

31. The apparatus of claim 22 wherein the request includes a Media Access Control address, an Internet Protocol address and at least one checksum, and the rerouting function rewrites the Media Access Control address and does not rewrite the Internet Protocol address and the at least one checksum.

32. The apparatus of claim 22 wherein the rerouting function tunnels the request to at least one other host computer device in the cluster.

33. A method for performing a distributed routing function while servicing requests that are transmitted from client devices to a cluster of host computers via the Internet, wherein said distributed routing function comprises:
receiving said requests at a router device on behalf of said cluster of host computers, wherein said router device operates to distribute said requests among said cluster of host computers;
monitoring, by a plurality of host computers within said cluster of host computers, connection establishment and termination between said client devices and said cluster of host computers;
receiving each of said requests at respective ones of said plurality of host computers within said cluster, such that each of said requests is received at a respective one of said plurality of host computers within said cluster to which said request is specifically directed by said router device;

determining, at said respective ones of said plurality of host computers within said cluster receiving respective ones of said requests, whether to service each of said requests based on predetermined criteria;

servicing respective ones of said requests at said respective ones of said plurality of host computers within said cluster receiving said respective ones of said requests if said predetermined criteria are satisfied; and rerouting respective ones of said requests by said respective ones of said plurality of host computers within said cluster receiving said respective ones of said requests, without processing said requests that are rerouted, to other ones of said plurality of host computers within said cluster, to obtain a predetermined distribution of the number of data units processed by each of said plurality of host computers in said cluster, if said predetermined criteria are not satisfied, wherein said rerouting is responsive, at least in part, to said monitoring of said connection establishment and termination between said client devices and said cluster of host computers.

34. The method of claim 33 further including the step of employing a hash value to designate one of the host computers in the cluster to service the request.

35. The method of claim 34 further including the step of using address information from the request including at least one Internet Protocol address and at least one Transmission Control Protocol port address as inputs to calculate the hash value.

36. The method of claim 33 further including the step of designating one of the host computers in the cluster to service the request based upon state information associated with the other computers in the cluster.

37. The method of claim 36 further including the step of designating the host computer to service the request based at least in part on information selected from the cluster consisting of load on each host, availability of data for the response, requested service type, requested file, requested file type, requested file size, level of Quality of Service to be extended to the particular client, and the necessity that successive requests be rerouted to the same host computer for correct session semantics.

38. The method of claim 33 further including the step of, when a request that designates a first address as destination is rerouted from a first host computer that is assigned said first address in said group to a second host computer that is assigned a second address in said group, modifying the request to designate the second address as destination before rerouting the request to the second host computer if only one address is published in the network for the cluster.

39. The method of claim 38 further including the step of servicing the request from the second host computer by transmitting a response that designates the first address as source to the client device.

40. The method of claim 33 wherein the request includes a Media Access Control address, an Internet Protocol address and at least one checksum, and further including the step of rewriting the Media Access Control address without modifying the Internet Protocol address and the at least one checksum.

41. The method of claim 32 including the further step of tunneling the request to at least one other host computer in the cluster.

* * * * *

UNITED STATES PATENT AND TRADEMARK OFFICE
CERTIFICATE OF CORRECTION

PATENT NO. : 6,370,584 B1  
DATED : April 9, 2002  
INVENTOR(S) : Azer Bestavros et al.

It is certified that error appears in the above-identified patent and that said Letters Patent is hereby corrected as shown below:

<u>Column 10,</u>
Line 30, "claim 32" should read -- claim 33 --.

Signed and Sealed this

Twenty-second Day of October, 2002

Attest:

Attesting Officer

JAMES E. ROGAN  
Director of the United States Patent and Trademark Office